No. 783,956.

PATENTED FEB. 28, 1905.

E. P. HOLDEN.
CAN TESTING MACHINE.
APPLICATION FILED JUNE 19, 1901.

10 SHEETS—SHEET 5.

Witnesses
Ira D. Perry
J B Weir

Inventor
Edward P. Holden.
by Charles U. Ries
Atty

No. 783,956. PATENTED FEB. 28, 1905.
E. P. HOLDEN.
CAN TESTING MACHINE.
APPLICATION FILED JUNE 19, 1901.
10 SHEETS—SHEET 6.
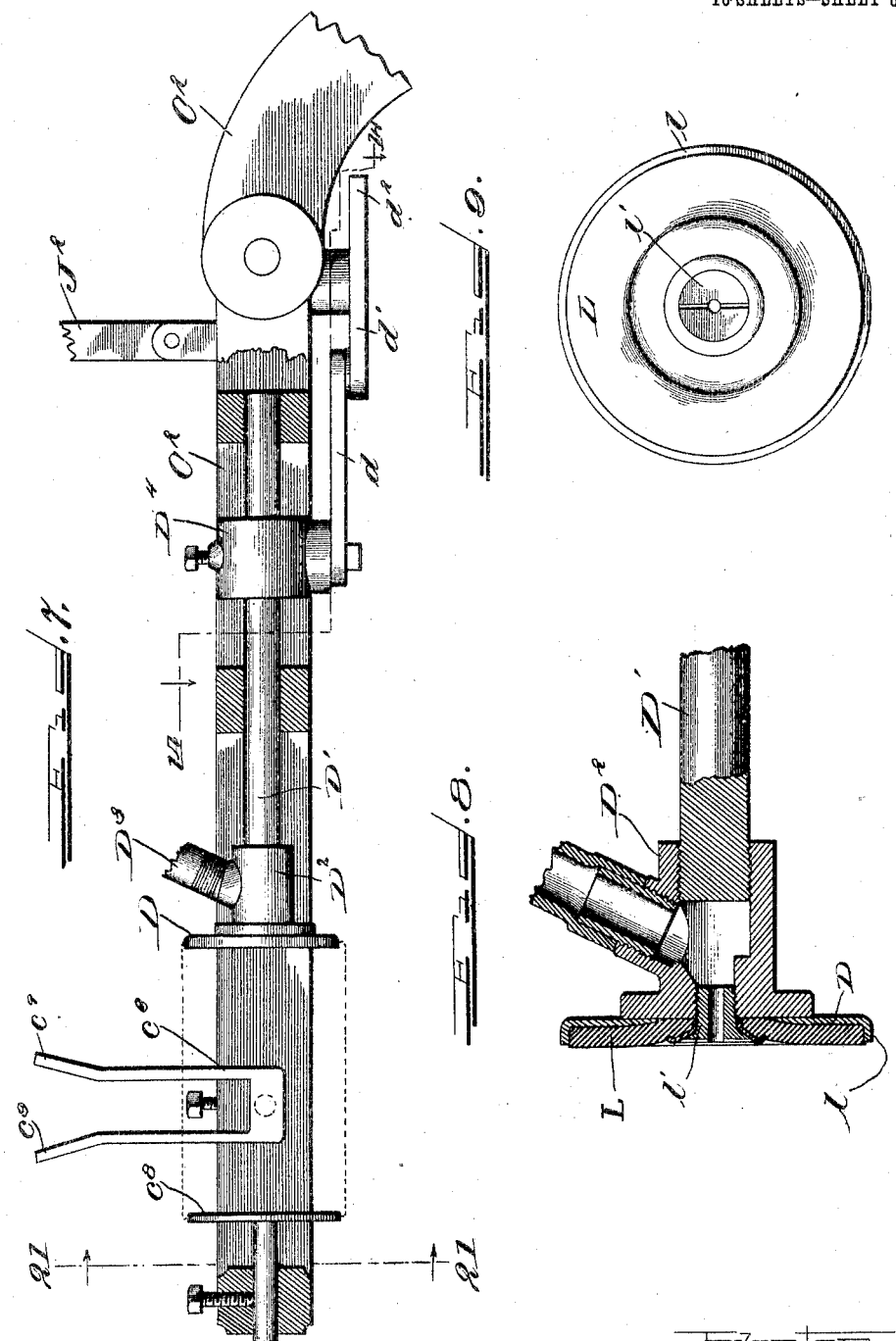

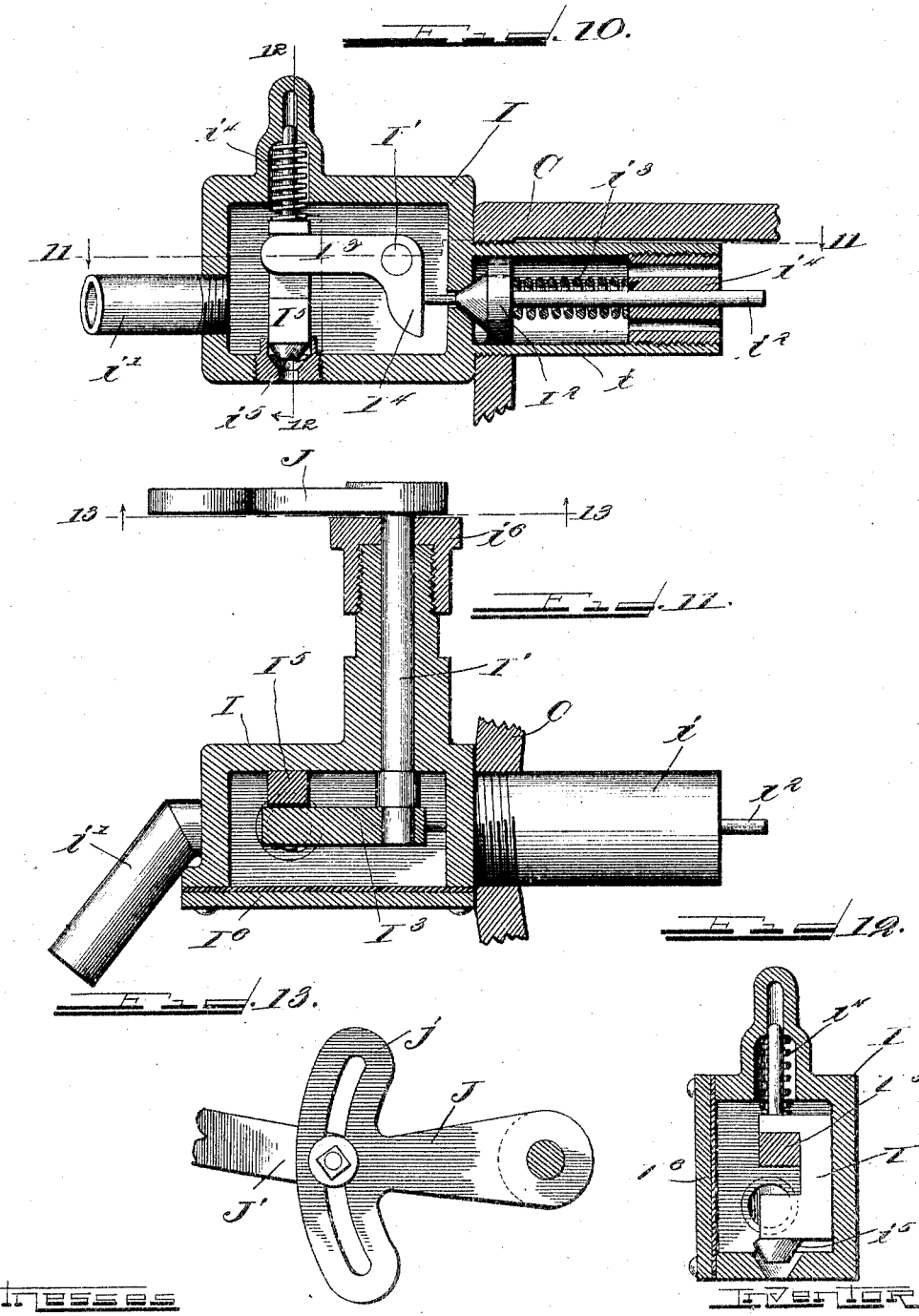

No. 783,956. PATENTED FEB. 28, 1905.
E. P. HOLDEN.
CAN TESTING MACHINE.
APPLICATION FILED JUNE 19, 1901.
10 SHEETS—SHEET 8.
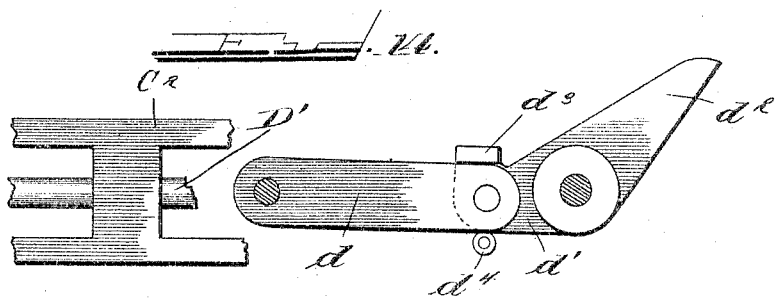
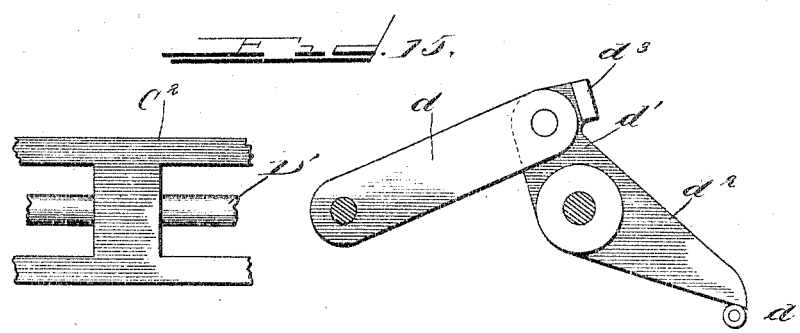
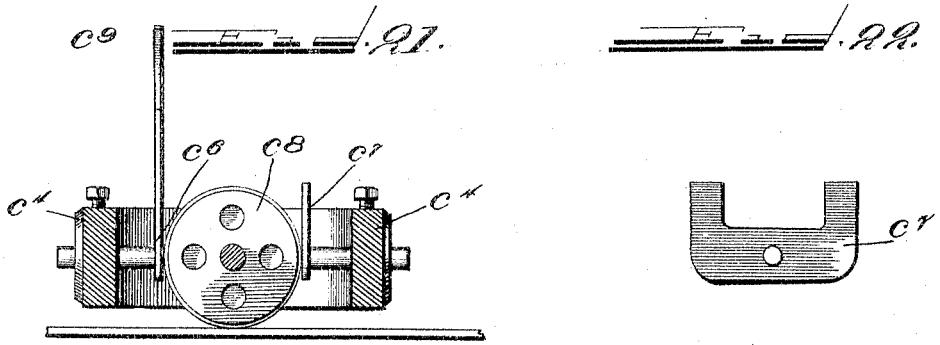
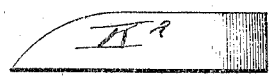
WITNESSES
Ira D. Perry
J. B. Keir
INVENTOR
Edward P. Holden.
by Charles M. Wills
Att'y No. 783,956. PATENTED FEB. 28, 1905.
E. P. HOLDEN.
CAN TESTING MACHINE.
APPLICATION FILED JUNE 19, 1901.

10 SHEETS—SHEET 9.

WITNESSES
Ira D. Perry
J. B. Keir

INVENTOR
Edward P. Holden.
by Charles U. Hills
Atty

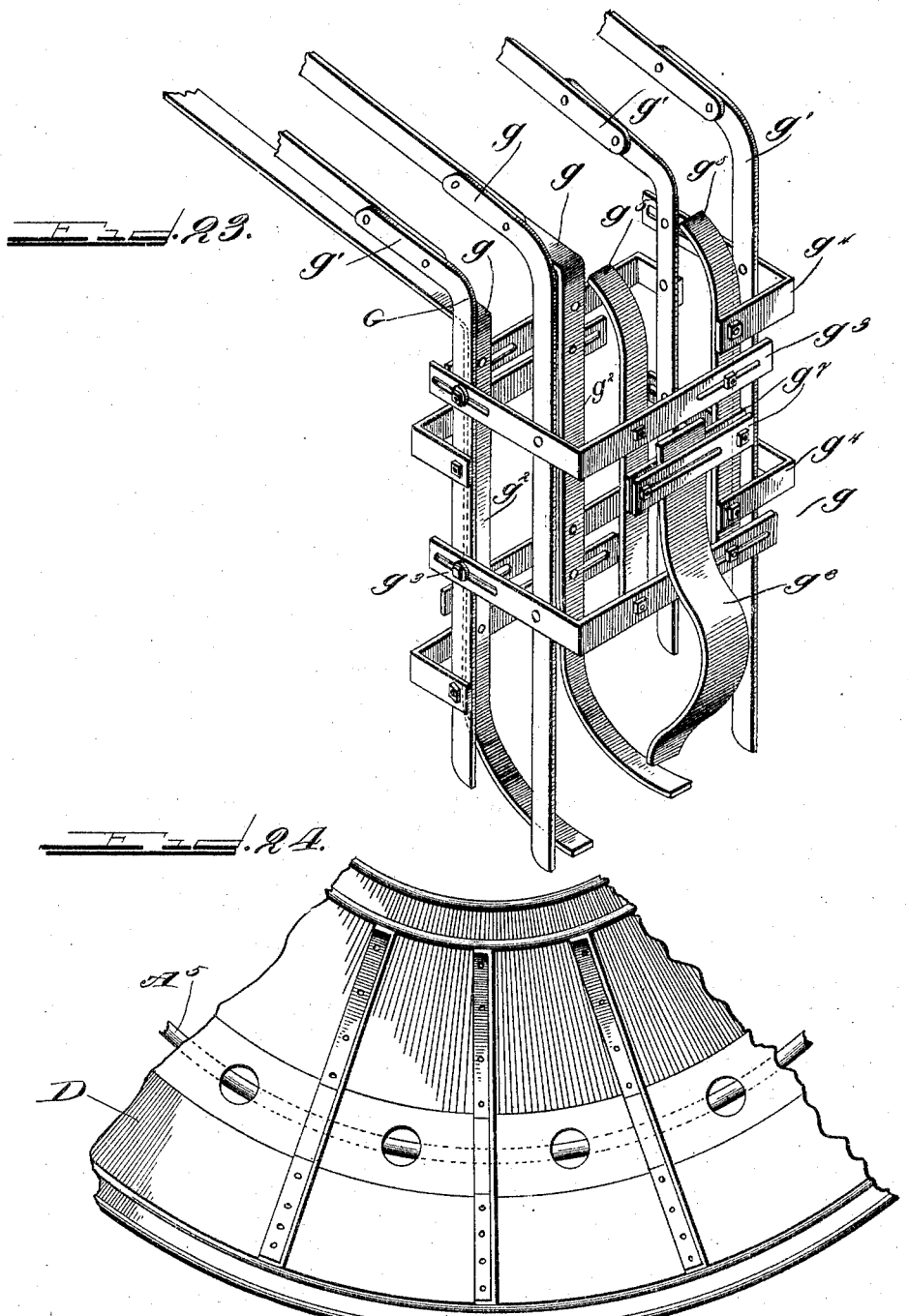

No. 783,956. Patented February 28, 1905.

UNITED STATES PATENT OFFICE.

EDWARD P. HOLDEN, OF CHICAGO, ILLINOIS.

CAN-TESTING MACHINE.

SPECIFICATION forming part of Letters Patent No. 783,956, dated February 28, 1905.

Application filed June 19, 1901. Serial No. 65,120.

*To all whom it may concern:*

Be it known that I, EDWARD P. HOLDEN, a citizen of the United States, and a resident of Chicago, in the county of Cook and State of Illinois, have invented certain new and useful Improvements in Can-Testing Machines, of which the following is a full, clear, and exact description, reference being had to the accompanying drawings, and to the letters of reference marked thereon, which form a part of this specification.

This invention relates to improvements in can-testing machines of that class in which the can to be tested is adapted to be submerged in a liquid and air or vapor forced into the same by appropriate means, whereby defective cans are discoverable by bubbles which rise upwardly therefrom through the liquid.

This invention consists in the matters hereinafter described, and more fully pointed out and defined in the appended claims.

Figure 1:
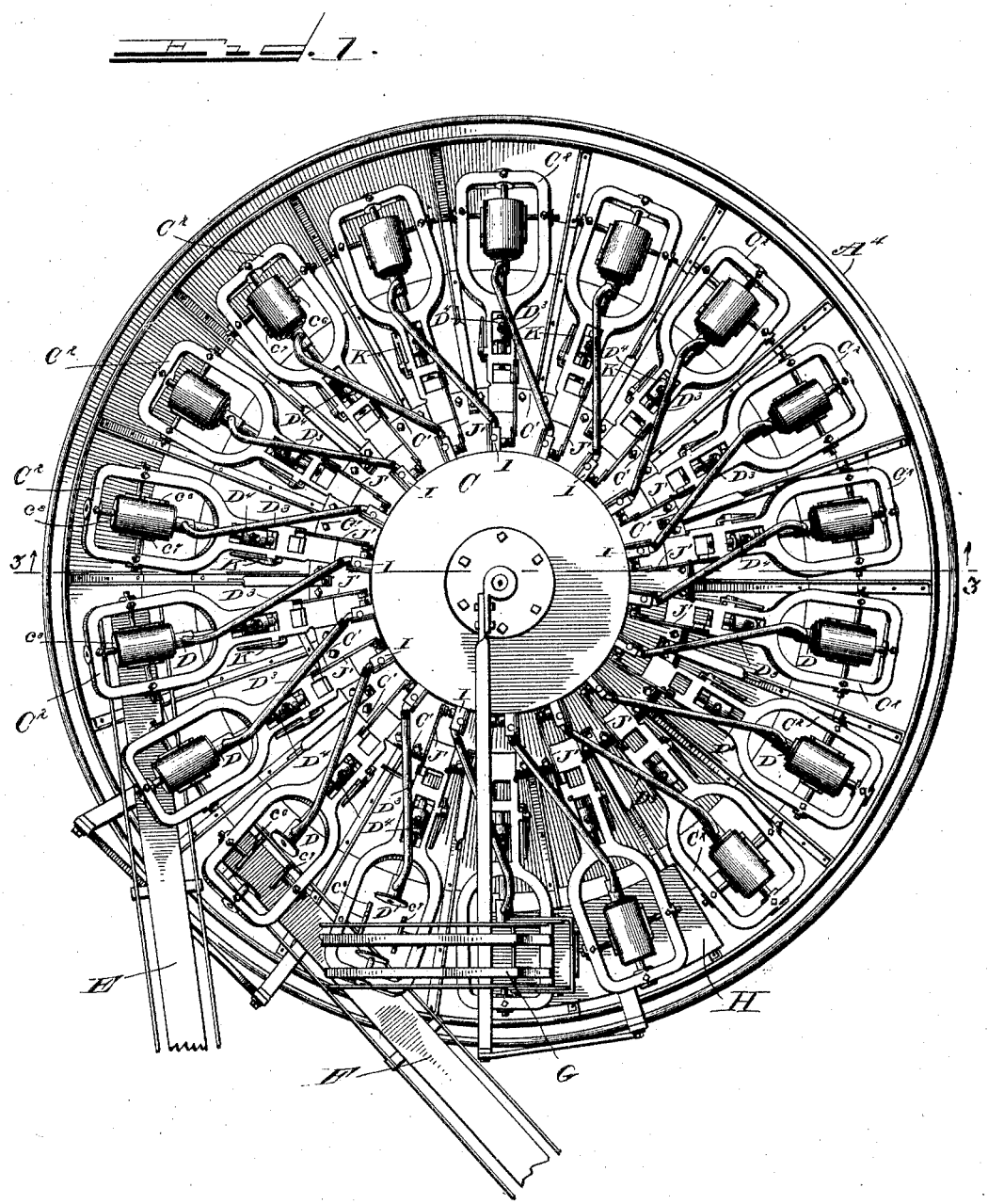
Figure 2:
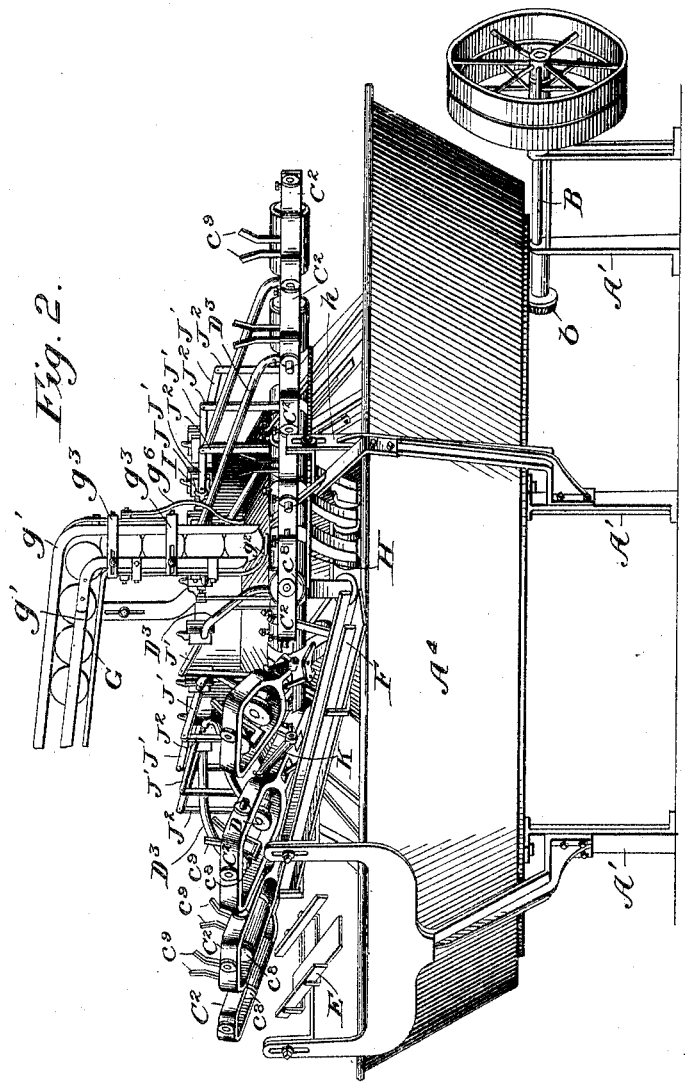
Figure 3:
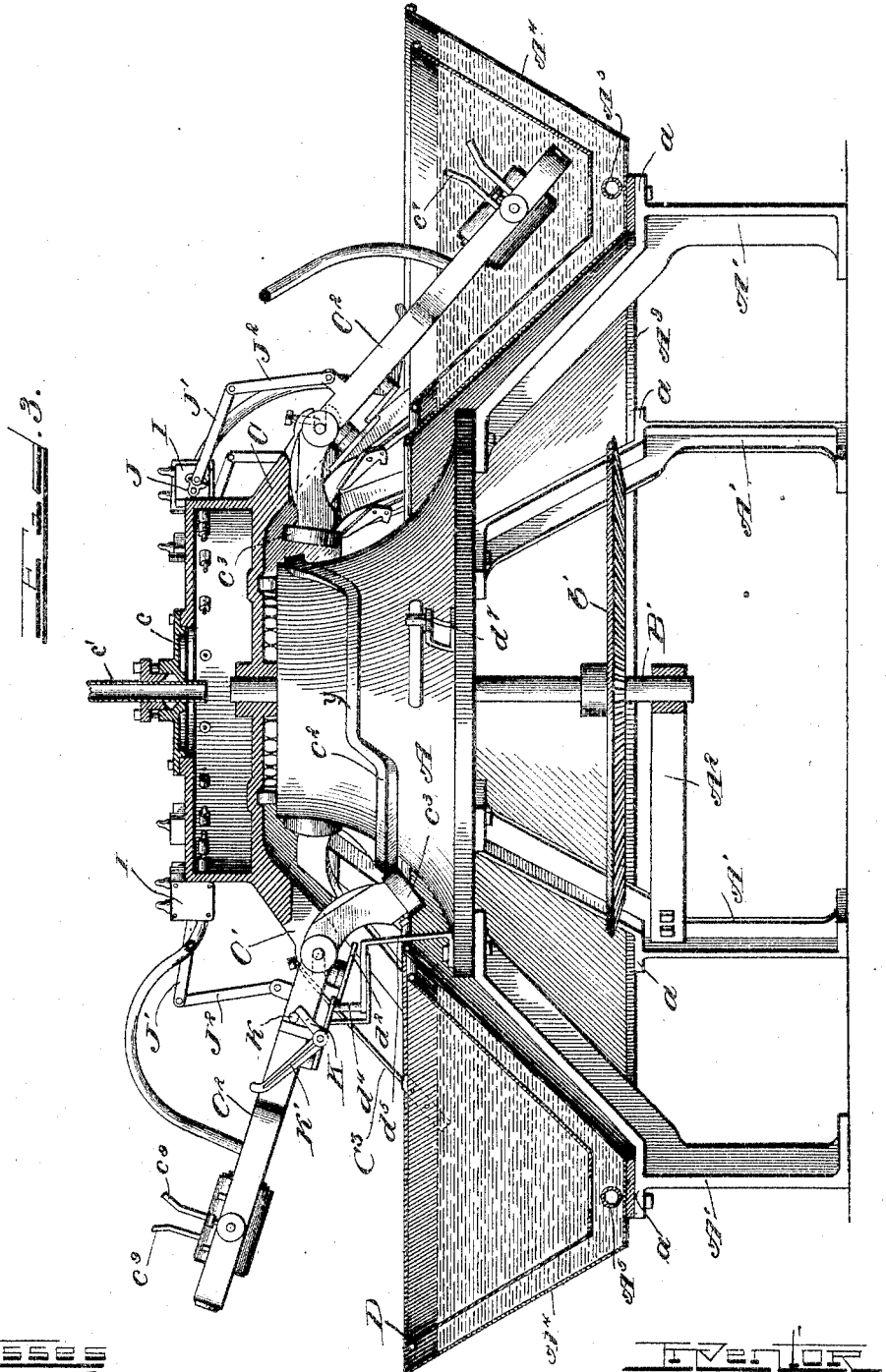
Figure 4:
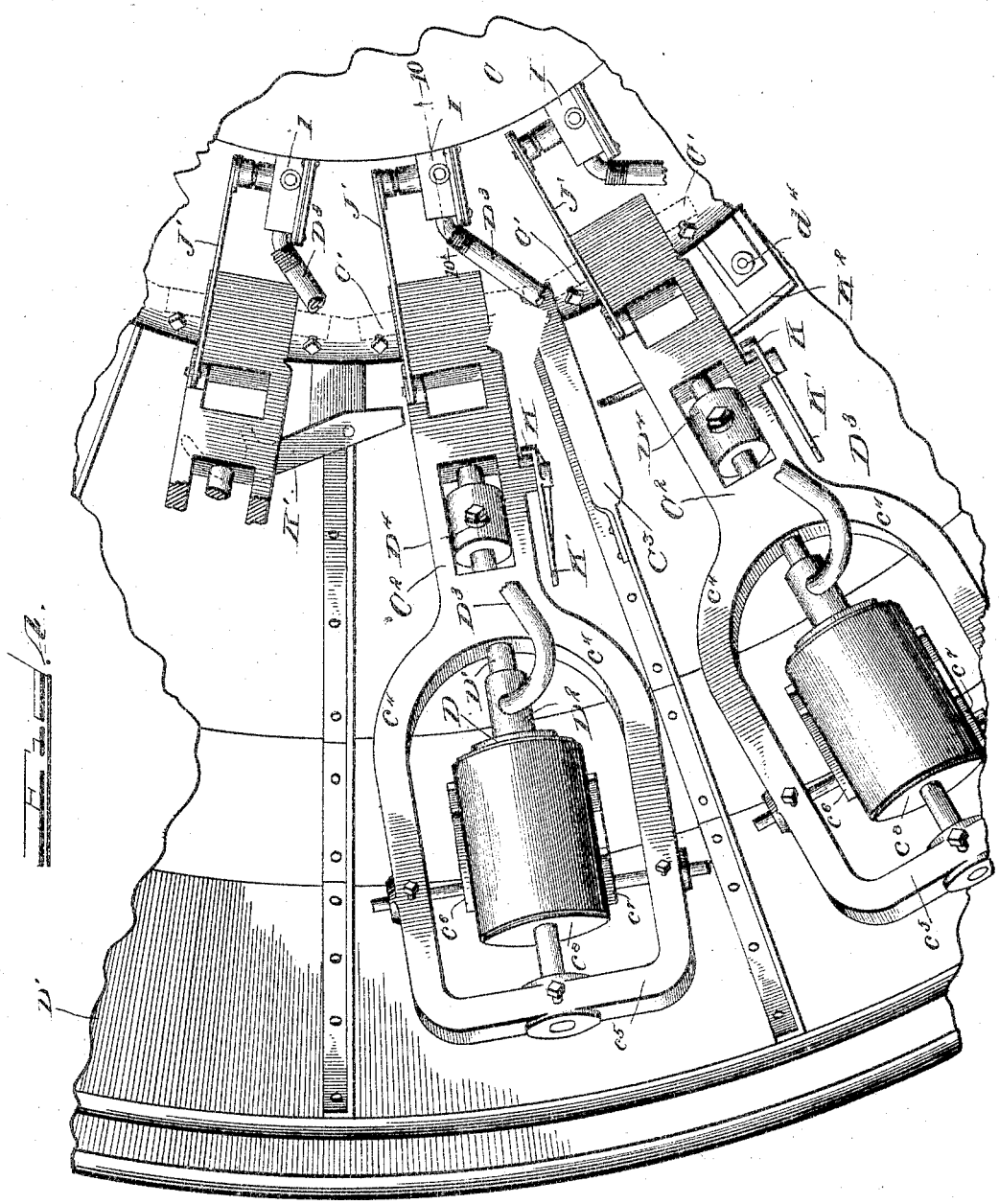
Figure 5:
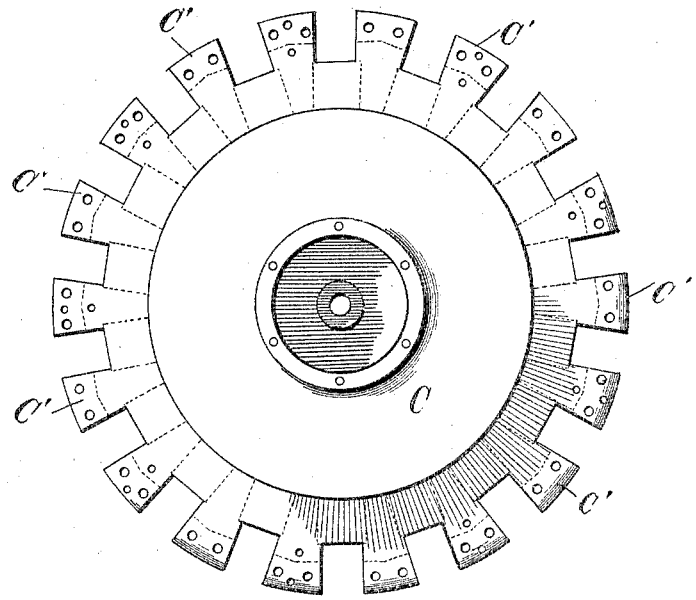
Figure 6:
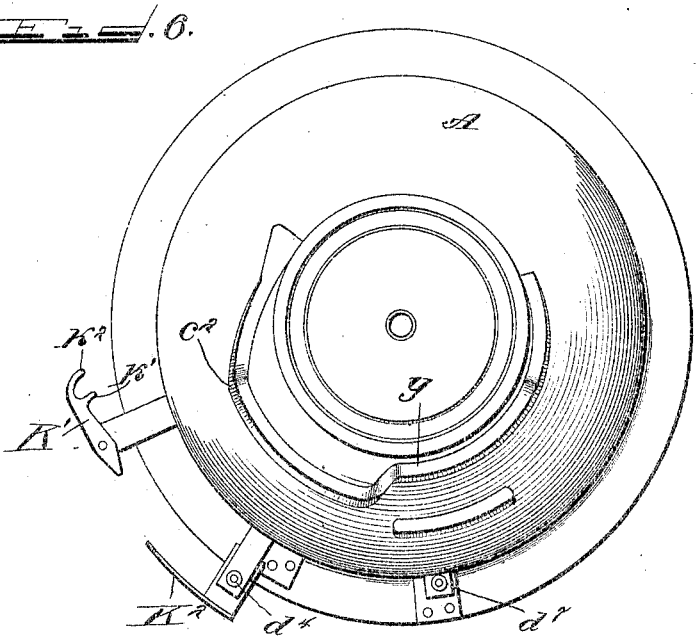
Figure 16:
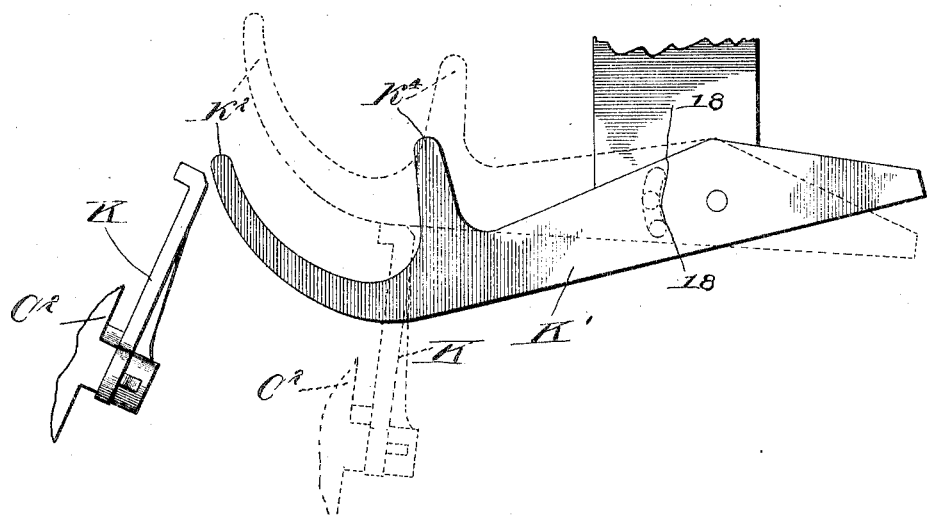
Figure 17:
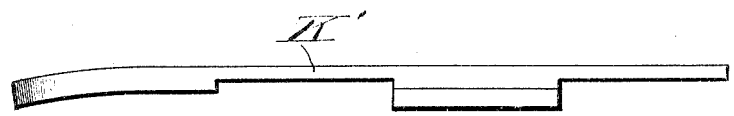
Figure 19:
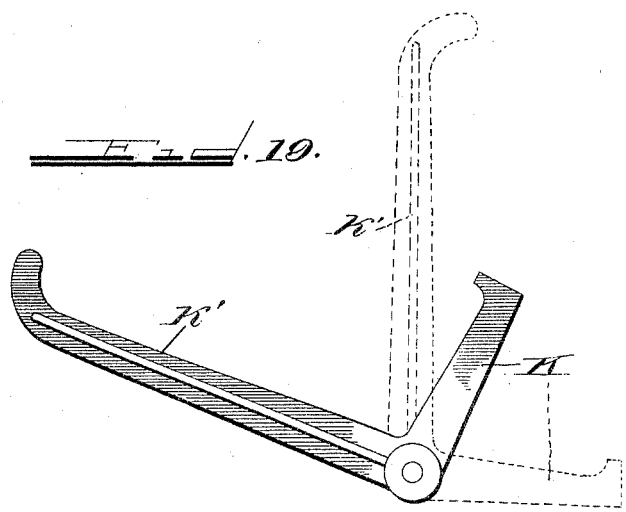
Figure 18:
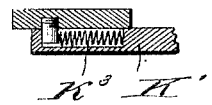

In the drawings, Figure 1 is a top plan view of a device embodying my invention. Fig. 2 is a front elevation of the same. Fig. 3 is a section taken on line 3 3 of Fig. 1 and showing a part of the machine in side elevation. Fig. 4 is a detail of a part of my invention, showing the same in top plan view. Fig. 5 is a top plan view of the cap, which is also an air-reservoir. Fig. 6 is a top plan view of a turret on which the revolving mechanism is supported. Fig. 7 is a view of one of the can-holding arms, shown partly in side elevation and partly in section. Fig. 8 is a longitudinal section of the movable head adapted to close the open end of the can. Fig. 9 is an end elevation of said head. Fig. 10 is a section taken on line 10 10 of Fig. 4. Fig. 11 is a section taken on line 11 11 of Fig. 10. Fig. 12 is a section taken on line 12 12 of Fig. 10. Fig. 13 is a section taken on line 13 13 of Fig. 11. Fig. 14 is a section taken on line 14 14 of Fig. 7. Fig. 15 is a view of the same, showing the parts in one of their operative positions. Fig. 16 is a detail of one of the parts of my invention and illustrating two positions of a can-lever which acts to release imperfect cans from the carrying-arm. Fig. 17 is a side elevation of the lever illustrated in Fig. 16. Fig. 18 is a section taken on line 18 18 of Fig. 16. Fig. 19 is a view of the tripping-lever, showing the same in two positions. Fig. 20 is a detail of a part of my invention. Fig. 21 is a section taken on line 21 21 of Fig. 7. Fig. 22 is a detail illustrating one of the clamping members acting to center the can in the carrying-arm. Fig. 23 is a perspective view of the discharge end of the can-rack. Fig. 24 is a fragmentary detail showing the construction of the tanks and the heating-coil in the lower tank.

As shown in the said drawings, A indicates a central turret having inwardly-curved sides, but generally of conical form. A' A' are the legs or standards, rigidly secured to said turret by bolting or like means and acting to support the same. Said legs or standards, as shown, consist of two parts—namely, a lower vertical part and an upper offset or oblique part—on the upper end of which is secured said turret by bolting through the base. Said legs are arranged radially around the turret, and said oblique upper parts extend outwardly and downwardly, as shown in Fig. 3. A ledge $a$ is provided at the upper end of the vertical portion of said legs, and a plate $A^3$, of iron or other suitable material is secured on said legs, extending around the periphery of the frame. $A^4$ indicates an annular tank, preferably of sheet metal, which surrounds said turret and is supported on the bed-plate $A^3$. As shown, said tank is relatively broad at its top and narrow at its bottom and forms, in effect, an annular flaring trough surrounding the turret and supported upon and secured to the frame of the same. $A^5$ indicates a coil of pipe lying in the bottom of said trough $A^4$ and adapted to permit steam or hot air to be passed therethrough, with the effect of heating the liquid contained in said trough.

$A^2$ indicates a bracket rigidly secured to one of the legs $A'$ by bolting or like means. B indicates a horizontal shaft provided with tight and loose pulleys in a familiar manner and in suitable brackets, one of which, as shown, is one of said legs $A'$. Said shaft extends radially inward beneath said tank, and the inner end thereof is provided with a beveled pinion $b$, as indicated in Fig. 2. B' indicates a vertical shaft journaled axially of the turret, the lower end of which is rotatively secured in the bracket-arm A², one end of which is rigidly secured to one of said legs A'. Said shaft is provided with a beveled gear-wheel $b'$, adapted to mesh with the beveled pinion $b$ on the shaft B.

C indicates a circular hollow cap forming an air-pressure chamber and rigidly secured on the upper end of the shaft B' and rotative therewith. Said air-pressure chamber is constructed of metal or other suitable material. As shown, the same is cast in one piece and is provided centrally at its top with an aperture adapted to be closed by means of a plate $c$ and suitable packing in a familiar manner. Said plate is provided with a central aperture surrounded by a stuffing-box and affording attachment for an air-pipe $c'$, leading to an air-pump of any preferred type. The cap is supported on the top of the turret A by means affording an antifriction-bearing therefor. As herein shown, a plurality of rollers are interposed between the turret and cap, as indicated in Figs. 3 and 6, for which a suitable race is provided on the upper end of the turret A and a similar race on the under surface of said cap. Said cap C is of greater diameter than the top of the turret and is provided on its lower edge with a peripheral flange which projects outwardly and downwardly on all sides of the same. The outer downwardly-extending edge of said flange is provided with a plurality of radial outwardly and downwardly extending integral arms C', between and to which are pivoted the vertically-movable carrying-arms C². D indicates an annular tank secured to said arms C' by means of hangers C³, as shown in Figs. 3 and 4, and adapted to rotate with said air-pressure chamber C. Said tank is divided radially into a number of compartments equal in number to the number of carrying-arms and located beneath the outer ends of the same. Said tank is adapted to be supported in the tank A⁴ out of contact with the side walls thereof, as shown in Fig. 3. Each of the compartments in said tank D is provided with an aperture at the bottom to permit free access of water or other fluids in the fixed tank A⁴ into the same. Water or other fluid introduced into the outer tank flows inwardly into the compartments of the inner tank, filling the same to the same level as the outer tank, thereby providing fluid for testing purposes and also partly supporting the weight of the inner tank with its contained fluid. Obviously this construction enables the parts to be made much lighter than would be the case if no outer tank were used. Said outer ends of the arms C² are adapted to be automatically moved into and out of its compartment during the operation of testing as follows: Said arms, of which two may be seen in side elevation in Fig. 3, are curved downwardly at their inner or upper ends and are provided at the extremity with a roller $c^3$, adapted to track on the lower cam-surface of a ridge $c^2$, herein shown as integral with the turret A. By reference to Fig. 3 it will be seen that the side of said turret is concave concentrically with the pivot for said arms and that said ridge $c^2$ provides a cam-surface on its under side adapted for engagement with said roller $c^3$, extending somewhat more than half the distance around said turret and varying in height thereon, as indicated in Fig. 6. Obviously during the rotation of the cap while the rollers at the inner ends of said arms bear upwardly against said cam-surface the outer ends of said arms are elevated at varying heights. Said ridge at its ends, however, terminates relatively high on the turret, so that as the inner ends of said arms approach the extremity of said ridge the outer ends of the arms enter the water in the compartment beneath the same and remain beneath the surface until said rollers are engaged by the opposite end of said ridge, which is slightly widened to project over the path of said rollers, as shown in Fig. 6. The outer ends of the arms are then again lifted out of the tank and carried at varying heights around the turret over chutes E and F, adapted to receive the tested cans, and beneath a can-rack G, from which untested cans are fed into said arms. Means are provided for automatically clamping a can in the outer end of said carrying-arm for supplying air thereto under pressure when the same is submerged and for releasing the can into one of said discharge-chutes after the same has been tested as follows: Said arm C² is provided at its outer end with an integral yoke comprising side members $c^4$ $c^4$ and an integral end member $c^5$. The sides and end of said yoke are apertured, as indicated in Fig. 4, to provide means for securing the adjustable clamping members $c^6$ $c^7$ $c^8$ thereto. Said clamping members are each secured upon a rod of metal or the like, adapted to be secured in said apertures in the yoke members by means of set-screws, which permit of adjustment of said clamping members for cans of any desired size. The said clamping member $c^6$ consists of a plate of metal rigidly secured to the inner end of the rod adapted to be secured to the rear yoke-arm $c^4$ and is provided with arms $c^9$ $c^9$, which project above the can, adapted to be engaged thereby. The clamping member $c^7$ is similar to the clamping member $c^6$, with the exception that the arms thereof are relatively short, as illustrated in Fig. 22. The clamping member $c^8$ consists of a circular plate adapted to be clamped to the rear or closed end of the can. The fourth clamping member, or that designed to clamp the open end of the can, comprises a pneumatic head D, apertured centrally, rigidly secured upon the end of a rod D' by means of a tubular fitting D², which has screw-threaded engagement with the outer end of said rod and is provided with a nipple affording means for connecting the flexible pipe $D^3$, communicating with the pressure-chamber, therewith. Said rod, as shown, is longitudinally movable in said arm $C^2$, which is apertured longitudinally to receive the same, and means are provided therefor as follows: Said arm $C^2$ is slotted longitudinally at its middle part, and a collar $D^4$ is secured on said rod $D'$ therein by means of a set-screw or other means, permitting adjustment of the same longitudinally of the rod, as shown clearly in Figs. 4 and 7. On the under side of said carrying-arm $C^2$ are secured the toggle-arms $d$ $d'$, of which, as shown, toggle-arm $d$ has one end thereof pivotally secured to the collar $D^4$ and the other end thereof secured to the outer end of the toggle-arm $d'$, which, as shown in Fig. 7, is pivoted near its center on the under side of the arm at a point adjacent to the pivot whereby said carrying-arm is secured to the cap. Said toggle-arm $d'$, as clearly shown in Figs. 14 and 15, is provided at its inner end with an inwardly and obliquely directed tail $d^2$.

Obviously when the toggle is in its extended position the same acts to push the rod $D'$ outwardly to the clamping position and when in its retracted position serves to draw said rod inwardly and the head $D$ out of its clamping position. For the purpose of insuring that said toggle will remain in clamping position it is necessarily subjected to when in such position means are provided for positively locking said toggle-arms in such extended position until the can is above one of said discharge-chutes. For this purpose the toggle-bar $d'$ is provided on its outer end, on the rear side thereof and adjacent to the point where the same is pivoted to the toggle-bar $d$, with an upwardly-projecting lug $d^3$, which engages the rear edge of the toggle-bar $d$ when said toggle-bars are in their extended position, as shown in Fig. 14, and acts to prevent longitudinal pressure on said toggle from the joint forwardly. Backward movement at said joint from longitudinal pressure is prevented by pivoting the meeting ends of said toggle-bars in advance of the points at which the same are secured, respectively, to the collar $D^4$ and to the carrying-arms $C^2$, as shown in Fig. 14, with the effect that inward pressure on the rod $D'$ causes the lug $d^3$ to more closely engage the rear edge of the toggle-bar $d$ and holding said toggle firmly locked in such position.

$d^4$, Figs. 3, 4, 6, and 14, indicates a roller journaled upon a bracket-arm $d^5$, which is secured to the lower edge of the turrets A on the same side and in alinement with the point where it is desired to discharge the perfect can and which projects upwardly sufficiently high to engage the outer end of the toggle-bar $d'$, as shown in Fig. 14. Contact of said toggle-bar in the forward motion of the carrying-arm with said roller $d^4$ acts to force the toggle rearwardly to the position indicated in Fig. 15, with the effect of retracting the rod $D'$ and the pneumatic head secured thereon from the open end of the can and permitting the same to fall into the chute F and to roll therefrom into a receiving tray or case.

The can-rack G is located beyond and above the chutes E and F and is constructed, as shown, of a plurality of strips $g$ $g'$ of metal or other suitable material, the bottom and sides of which form a chute for the can, and inclines downwardly at its inner or discharge end. At the inner ends said strips are connected integrally with the strips $g^2$ $g^2$, which extend downwardly and forwardly, as indicated in Figs. 2 and 23. Adjustably secured to the respective strips $g$ $g'$ $g^2$ by means of bolts or the like are the transverse bands $g^3$ $g^4$, which pass partly around the head or discharge end of the rack and are slotted to receive said bolts, thereby affording means for adjusting the rack laterally to receive cans of a larger or smaller size. Secured on the strips $g^3$ $g^4$ opposite the strips $g$ $g$ are the strips $g^5$ $g^5$, between which and said strips $g$ $g$ the cans are supported vertically, as shown in Fig. 2. A spring $g^6$, herein shown as a leaf-spring, the lower end of which depends in position to press against the lowermost can in the rack and hold the same against the lower forwardly-curved end of the strips $g$ $g$. Said leaf-spring is secured to said strips $g^5$ $g^5$ by means of the plates 7, between which the upper end of the spring is adjustably clamped.

A table H is adjustably supported by means of the slotted arm or standard $h$, attached to one of the legs $A'$ of the frame, and extends horizontally beneath the discharge end of the can-rack and forwardly of the same in position to support the can as it drops from the rack. After the carrying-arm has passed the position where the tested can is discharged into the chute the outer end of said arm drops to a horizontal position, the roller at the inner end of the same being engaged beneath the horizontal portion (marked $y$) of the cam-ridge $c^2$ and passes between said table H and the discharge end of said can-rack. The upwardly-extending arms $c^9$ $c^9$ of the clamping member $c^6$ pass between the strips $g^2$ $g^2$ and engage the cans as they successively fall into position therefor and draw the same out of the rack, whereupon the same falls upon the table H and within the yoke of said carrying-arm. When the can drops into a carrying-arm, it is not at first clamped therein, but falls upon said table between the lateral clamping members $c^6$ $c^7$, and as the arm moves forward the can rolls along the table till it is exactly centered between the heads D and $c^8$. The tail $d^2$ of the toggle-bar $d'$ now comes into engagement with a roller $d^7$, rigidly supported on the lower margin of the turret, and is forced rearwardly, thereby throwing the toggle to its extended and locked position, thereby forcing the head D into clamping engagement with the open end of the can. The outer end of the carrying-arm after passing said table H moves downwardly, with the can clamped therein, into the liquid in the compartment beneath the same, as shown in Fig. 3. Said downward movement of the outer end of said carrying-arm opens a valve I and admits air under pressure from the pressure-tank through the pipe $D^3$ into a can, as herein shown, secured in the carrying-arm next in advance thereof. As shown, said valve I is secured on the cap C by means of a tubular sleeve or fitting $i$, having screw-threaded engagement with the side wall of the cap in alinement with one of said carrying-arms and communicating with said pressure-chamber. The opposite end of the valve-casing is provided with a tubular fitting $i'$, adapted to have secured thereon one end of one of the flexible pipes $D^3$, which communicate with said pressure-chamber through the said valves I and with the can during the operation of testing through the head D, as illustrated in Figs. 1, 2, and 4. Obviously any desired form of valve may be so connected with said carrying-arms as to be operated by the vertical movement thereof to admit air into the can during the operation of testing and to prevent the escape of the air therefrom as soon as the test is complete; also, any means for connecting the same with said arms may be employed, and I have herein shown but one of many possible means for securing these results. A valve-stem $I'$ leads inwardly of the valve-casing and is provided on its inner end with horizontally and vertically extending arms $I^3 I^4$, herein shown as integral and adapted, respectively, to operate the valve-closures within said valve-casing.

$I^2$ indicates a conical valve-closure located in the sleeve $i$ and normally held in a conical seat in the valve-casing by the air-pressure from the compression-tank and by a spring $i^3$, secured on a rod $i^2$, which passes through the valve-closure $I^2$ into position for engagement by the arm $I^4$. Said spring is herein shown as a spiral spring and engages at one end the inner side of the valve-closure $I^2$ and at the other end the perforated collar $i^4$, secured in the inner end of the sleeve $i$. Obviously said spring $i^3$ may be omitted, if desired, and said valve operated wholly by air-pressure. The arm $I^3$ extends horizontally and forwardly and engages with its end a vertically-movable plunger $I^5$, the lower end of which is conical and adapted to form a closure for a complemental aperture at the bottom of the valve-casing adapted to permit the escape of air therefrom. The upper end of said plunger is provided with a spring adapted normally to hold the valve closed. Said valve-casing I is provided on one side with a plate $I^6$, adapted to be rigidly bolted thereto, together with suitable packing, in a familiar manner and by its removal to afford access to the valves for purposes of adjustment or the like. The outer end of the valve-stem $I'$ is provided with a stuffing-box $i^5$ and adapted to prevent the escape of air therethrough. On the outer end of said valve-stem is rigidly secured a crank-arm J, provided at its end with a slotted segment $j$, to which is adjustably secured by bolting or like means a rod $j'$, extending radially outward, as indicated in Figs. 1, 2, and 3. The other end of said rod $J'$ is hinged to the upper end of a similar rod $J^2$, the lower end of which is pivotally secured upon the corresponding carrying-arm and at some distance from the pivot on which the arm swings. The operation of this part of my invention is as follows: So long as the carrying-arm is in its elevated position the rod $J^2$ holds the outer end of the rod $J'$ and crank J elevated, with the effect of holding the plunger $I^5$ in its elevated position, while the valve-closure $I^2$ is in its closed position, thereby permitting free passage of the air through the pipe $D^3$ outwardly through the vent-aperture in said valve, while preventing escape of air from the pressure-chamber. When, however, the carrying-arm falls to its testing position, or, in other words, to a position in which the can held thereby is submerged in the testing fluid, the downward movement of said carrying-arm and the rod $J^2$ pulls the rod $J'$ and the crank J downwardly, with the effect that the arm $I^4$ within the valve-closure presses inwardly upon the rod $i^2$ and opens the valve leading from the pressure-chamber, while the arm $I^3$ being out of engagement with the plunger $I^5$ the spring thereof forces the same downwardly and tightly closes the vent-aperture. Air from said pressure-chamber now flows through said valve and flexible tube $D^3$ and head D into a can held by the arm with which said tube is connected and which, as herein shown, is that next in advance of the carrying-arm which actuates the valve. When air under pressure is turned into said can, as described, if any imperfection or leak exists therein it is instantly detected from bubbles rising through the testing liquid, and means are provided, hereinafter more fully described, for discharging such imperfect cans into the chute E, which is located in advance of the chute F and designed to receive the imperfect cans. The continued rotation of the cap causes the inner ends of the carrying-arm to again engage the cam-ridge $c^2$. The outer ends of said carrying-arms are elevated above the testing liquid, producing corresponding elevation of the bar $J'$, the crank J, and the plunger $I^5$ and permits the closing of the valve from the pressure-chamber, whereupon the air-pressure within said can instantly returns to the normal by the escape of air through the tube $D^3$ and the vent.

Means for discharging imperfect cans into the chute E are provided, as follows: Pivoted on one side of each carrying-arm adjacent to the slot for the collar $D^4$ is a lever-arm K, adapted in its retracted position to swing upwardly against a stop $k$ on said arm, as indicated in Fig. 3. The actuating-lever $k'$ for said arm extends forwardly along said arm into position to be manually engaged by an operator stationed beside the machine and who, if he observes bubbles rising from a can when submerged, throws the lever on the carrying-arm in which said can is secured inwardly, thereby throwing the arm K downwardly to the position indicated in Fig. 16 and in dotted lines in Fig. 19. Pivoted to the lower margin of the turret adjacent to the chute E and with its engaging end directed oppositely from the direction of rotation of the cap and carrying-arms is the trip-lever K. The free end of said trip-lever is turned upwardly and is provided with an upwardly-curved finger $k^2$. Said finger $k^2$ engages the upper side of said arm when the same comes into operative position and slides up over the same in the position indicated by the dotted lines in Fig. 16. The upwardly-directed finger $k^4$ now engages the toggle-bar $d'$ beneath the carrying-arm and pushes the same rearwardly in a manner heretofore described for the roller $d^4$, thereby retracting the clamping-head D from the can and permitting the same to fall into the chute E directly beneath the same. As the continued rotation of the cap carries the arm K past said trip-lever a spring $k^3$, located in a transverse slot in the support for the trip-lever K', as shown in Fig. 18, and one end of which engages the support for the trip-lever and the other end of which engages the trip-lever, forces said trip-lever downwardly out of position to engage the toggles on the succeeding arm. For the purpose of returning the arm K to its retracted position a plate $K^2$ is supported from the turret adjacent to the roller $d^4$ and provided with an upwardly-inclined surface adapted to engage beneath the arm K and to turn the same back against its stop $k$.

The head D may be constructed in any desired manner; but as shown in Figs. 8 and 9, and preferably, the same consists of a relatively thin circular flanged plate of metal apertured centrally and having a flat surface for contact with the fitting $D^2$. Said plate is beveled on its inner side about said aperture, as shown in Fig. 8. A centrally-apertured pad of rubber or other resilient material (herein indicated by L) is placed against said plate within the flange $l$ and an apertured flanged nipple $l'$ is inserted therethrough and has screw-threaded engagement with the fitting $D^2$. Obviously the construction shown provides an exceedingly cheap and simple construction and one that insures a perfectly air-tight joint between said head and the can when clamped in engagement therewith. The pad L, the only portion that can in any case suffer by wear or use, may be readily removed and replaced without serious inconvenience or loss of time.

Many of the features of construction illustrated and above described are not essential to the carrying out of the broad features of my invention when separately considered. The scope of the invention will be set forth in the concluding claims, and it is to be understood that the omission of an element or the omission of particular features of any of the elements mentioned in any given claim is intended to be a formal declaration that the omitted elements or features are not essential to the invention therein covered.

I claim as my invention—

1. The combination with vertically-movable carrying-arms of a fluid-containing tank and means for revolving the tank beneath said carrying-arms.

2. The combination with vertically-movable carrying-arms, of an annular fluid-containing tank, means for revolving said tank with the contained fluid beneath said carrying-arms in operative relation therewith.

3. The combination with a fluid-containing tank, of means for revolving the same, means for partly supporting the weight of the tank and its contents while revolving and radial partitions dividing the same into a plurality of compartments.

4. The combination with vertically-movable carrying-arms of an annular fluid-containing tank adapted to revolve beneath said carrying-arms and divided radially into a plurality of compartments one located beneath each arm.

5. The combination with a revoluble central member of vertically-movable carrying-arms pivoted thereon and adapted to revolve therewith and a fluid-containing tank located beneath and revolving with said carrying-arms.

6. The combination with a revoluble central member of radial, vertically-movable carrying-arms pivoted thereon and revolving therewith and an annular fluid-containing tank revolving with and beneath said carrying-arms, said tank being divided radially into a plurality of compartments.

7. The combination with a revoluble central member of radial vertically-movable carrying-arms pivoted thereon and revolving therewith, an annular fluid-containing tank revolving with and beneath said carrying-arms and radial partitions in said tank dividing the same into compartments equal in number to the carrying-arms.

8. The combination with vertically-movable and horizontally-rotatable carrying-arms, of a fluid-containing and partly-fluid-supported tank adapted to move with and beneath said carrying-arms and in operative relation therewith.

9. The combination with a revoluble central member of radial vertically-movable carrying-arms pivoted thereon and revolving therewith and a fluid-containing, partly-fluid-supported tank located beneath and revolving with said carrying-arms.

10. The combination with a revoluble central member of radial vertically-movable carrying-arms pivoted thereon, and revolving therewith and an annular fluid-containing, partly-fluid-supported tank located beneath said carrying-arms and also connected and revolving with said central member.

11. The combination with a revoluble central member of radial vertically-movable carrying-arms pivoted thereon, and revolving therewith, an annular fluid-containing and partly-fluid-supported tank located beneath said carrying-arms, and revolving isochronously therewith, said tank being divided radially into a plurality of compartments each of which is located beneath and adapted to operate with a carrying-arm.

12. The combination with a stationary tank adapted to contain a fluid, of a tank adapted to be supported within and to revolve within said stationary tank, said revolving tank being divided into a plurality of compartments.

13. The combination with a stationary fluid-containing tank of an annular tank partly supported by said fluid and revoluble within the same and divided radially into a plurality of compartments.

14. The combination with a stationary tank having a fluid therein of an annular tank partly supported by said fluid and revoluble within said stationary tank, radial partitions dividing the revoluble tank into a plurality of compartments, said compartments being provided with apertures opening into the stationary tank.

15. The combination with a stationary tank, adapted to contain fluid, of an annular partly-fluid-supported tank revoluble therein and divided radially into compartments, a coil of pipe in the stationary tank affording means for changing the temperature of the fluid therein and apertures leading from each compartment of the revoluble tank into the stationary tank, whereby the fluids in both tanks are maintained at like temperature.

16. In a machine of the class described, the combination with an annular stationary tank adapted to contain a fluid, of a similar tank partly supported by said fluid and revoluble in the stationary tank said revoluble tank being divided radially into a plurality of compartments each provided with an aperture in its bottom and means for maintaining the fluids in both tanks at a desired temperature.

17. The combination with a supporting-frame, of a revoluble cap journaled thereon, an annular fluid-containing tank rigidly secured thereto, and means for partly supporting said tank with its contents in a fluid.

18. The combination with a frame of an annular tank supported thereon, a revoluble cap journaled on the top of said frame, a tank located within and similar to the first-mentioned tank and secured to and revolving with said cap, said revoluble tank being divided radially into a plurality of compartments, each provided with an aperture in the bottom whereby fluid in one tank has free access with the other.

19. The combination with vertically-movable carrying-arms, of means for securing a can to be tested therein and a tank adapted to contain a fluid in which the can is submerged during the testing operation, and adapted to have forward movement with the carrying-arm.

20. The combination with vertically-movable carrying-arms, each adapted to move about a central point, of a plurality of fluid-containing receptacles, each located beneath one of said arms and into which the outer end of the same is depressed during the testing operation.

21. The combination with a revoluble pressure-chamber, of vertically-movable carrying-arms secured on the side walls thereof, an annular fluid-containing tank rigidly secured to the walls of said pressure-chamber, and adapted to revolve therewith, said tank being divided into a plurality of compartments each located beneath one of said arms and adapted to receive the same during the testing operation.

22. In a machine of the class described, the combination with a revoluble pressure-chamber, of carrying-arms pivoted on the walls thereof and a separate tank for each carrying-arm secured to the walls of said pressure-chamber, revolving therewith.

23. The combination with a supporting-frame, of a revoluble pressure-chamber journaled thereon and having carrying-arms pivoted on the walls thereof, means for moving said carrying-arms vertically and a fluid-containing tank adapted to revolve with said pressure-chamber and into and out of which the ends of the carrying-arms move during the revolution.

24. The combination with a frame of a revoluble pressure-chamber journaled thereon, vertically-movable carrying-arms secured on said pressure-chamber, means for raising and lowering the outer ends of said carrying-arms and a partly-fluid-supported fluid-containing tank also secured on the pressure-chamber and having a compartment for each carrying-arm into which the outer end of the corresponding carrying-arm is submerged during a part of the revolution.

25. The combination with a supporting-frame of a revoluble cap journaled thereon, a vertically-movable carrying-arm pivoted intermediate of its ends on the margin of said cap, means in the outer end of said carrying-arm adapted to engage a can or the like, a fluid-containing movable tank, means operating at the inner end of said carrying-arm to move the outer end thereof with a can therein into and out of said tank and means for forcing air into the can when in a submerged position.

26. The combination with a frame, of a cam-track extending partly around the same at varying heights, a pressure-chamber revolubly supported on the frame, vertically-movable carrying-arms pivotally supported intermediate their ends on the pressure-chambers and adapted to engage with their inner ends said cam-track whereby the outer ends of said arms having a can or the like secured thereon are successively submerged in a fluid, a compartment revoluble with said arms containing said fluid and automatic means for admitting air from said pressure-chamber into said can when submerged.

27. The combination with a frame of a revoluble cap supported thereon, vertically-movable carrying-arms pivoted on said cap and engaging with their inner ends a track secured on said frame and extending partly around the same whereby the outer ends of said arms are successively submerged in a fluid-containing receptacle located beneath the same and means operating automatically to admit air under pressure into a can clamped in said outer end of a carrying-arm when submerged and to permit the escape therefrom when supported above the fluid.

28. The combination with a frame, of a revoluble cap supported thereon by antifriction-bearings, a pressure-chamber in said cap, a fluid-containing tank secured to said cap and revolving therewith, a plurality of can-carrying arms pivoted on the periphery of the cap and means for successively dipping the outer ends of the same beneath a fluid in said tank and elevating the same therefrom and means operated by the movement of said carrying-arm for admitting air under pressure into a can held in the outer end of said arm when in its depressed position and of permitting the escape of the same therefrom when elevated above the tank.

29. The combination with a frame of a conical turret supported thereon, a revoluble cap supported on said turret on antifriction-bearings, a pressure-chamber in said cap, a fluid-containing and partly-fluid-supported tank rigidly secured on said cap and revoluble therewith, a plurality of can-carrying arms pivoted on the periphery of the cap, means for successively submerging the outer ends of the same into the fluid in said tank and elevating the same therefrom and means operated by the movement of said carrying-arms acting to admit air under pressure within a can clamped thereon when submerged and to permit the escape of the same therefrom when elevated above the tank.

30. The combination with a support of a cap revoluble thereon, and provided at its lower margin with an annular flange depending therefrom, can-carrying arms pivoted on said flange intermediate of their ends and engaging with their inner ends a cam-track extending partly around said support at varying heights thereon, whereby the outer ends of said can-carrying arms are successively depressed and elevated during a revolution around the frame.

31. The combination with a support and a fluid-containing tank of a revoluble cap supported thereon and provided with arms extending downwardly and obliquely on all sides of said support and out of contact therewith, carrying-arms pivoted at points intermediate of their ends on said downwardly-extending arms and engaging at their inner ends a cam-track extending at varying heights around said frame, said carrying-arms having the outer ends heavier than the inner and being provided at their inner ends with rollers adapted to engage said cam-track whereby said outer ends are supported at varying heights during a part of the revolution of the cap and to depend beneath the fluid in said tank during the remainder of the revolution.

32. The combination with a conical turret having incurved sides of a circular revoluble cap supported thereon and having a diameter greater than that of the turret at its top, a plurality of radial carrying-arms pivoted intermediate of their ends on said cap concentric with the inward curvature of the sides of the turret and a cam-track secured on and extending at varying heights partly around said turret which engages the inner end of each carrying-arm during a part of the revolution of the cap.

33. The combination with a supporting-frame provided at its top with a conical turret having inwardly-curved sides, a circular rotative cap revoluble on said turret and provided with downwardly-depending arms on each side of the same, carrying-arms pivoted on said arms concentric with the curvature of the sides of the turret and engaging with their inner ends a cam-track secured on and extending at varying heights partly around the turret and acting to support the outer ends of the carrying-arms at varying heights during the revolution of the cap and to permit the same to swing downwardly when their inner end is out of engagement therewith.

34. The combination with a conical turret having incurved sides, of a circular cap revoluble thereon and provided with a peripheral flange extending obliquely downward to the center of a curvature for the incurved sides of the turret, a cam-track secured on the turret at varying heights, carrying-arms pivoted intermediate of their ends on said flange and provided at their inner ends with an antifriction-roller adapted to engage said cam-track.

35. The combination with a conical turret, of a fluid-containing tank, a cap revoluble thereon and provided with a peripheral flange extending obliquely downward below the top of said turret, radial carrying-arms pivoted intermediate of their ends on said flange and a cam-track secured on said turret adapted to engage the inner ends of said carrying-arms and supporting the outer ends thereof at varying heights during a part of the revolution of said cap and permitting said outer ends to descend beneath the fluid in said tank when said inner ends are disengaged from said track.

36. The combination with a conical turret, of a revoluble cap supported thereon by antifriction-bearings, a pressure-chamber in said cap, an annular fluid-containing tank below said cap, a plurality of can-carrying arms pivoted intermediate of their ends on the margin of the cap and engaging with their inner ends a cam-track extending partly around the turret whereby the outer ends of said carrying-arms are elevated and depressed at different points in the revolution of the cap, clamping means at the outer ends of said carrying-arms whereby a can may be secured therein, pneumatic connections between the open end of a can when clamped therein and said pressure-chamber acting to admit air under pressure to the can when the carrying-arm is depressed and means for disconnecting the pressure-chamber therefrom and permitting the escape of air from the can when said arm is in its elevated position.

37. In a machine of the class described the combination with a supporting-frame and a fluid-containing tank, of a cap adapted to rotate on antifriction-bearings on said frame, vertically-movable arms pivoted on said cap each having near the outer end of the same clamping means adapted to engage a can to be tested, means operated by the revolution of the cap acting to secure the cans in said arms and means for automatically discharging the perfect and the imperfect cans into separate chutes predetermined by an operator, and without arresting the motion of the machine.

38. The combination with a supporting-frame, of a cap having a pressure-chamber therein and revolubly supported on said frame, vertically-movable carrying-arms pivoted on said cap, a liquid-containing tank located near the outer ends of said arms and revoluble therewith and in which the same are submerged during a part of the revolution of the cap, automatically-operated clamping members on said outer ends adapted to engage the cans to be tested, pneumatic connections with said pressure-chamber through the clamping members adapted to engage the head of the can, means operated by the revolution of the cap acting to secure the cans in said arms and to admit air under pressure thereinto when submerged, and means for automatically discharging the tested cans into predetermined chutes.

39. A carrying member comprising a vertically-swinging arm, a yoke at its outer end, adjustable clamps therein, a longitudinally-movable rod engaged on one of said clamps adapted to move said clamp against the ends of a can and hermetically seal the same, means communicating with a source of air-pressure acting to admit compressed air into said can when so engaged and means on said arm acting to automatically discharge said can at predetermined locations.

40. A carrying-arm for machines of the class described, provided intermediate of its ends with means for pivotally supporting the same, a yoke at its outer end, independently-adjustable clamping means in said yoke and an antifriction-roller on the inner end of said arm adapted to engage a cam-track.

41. In a machine of the class described, the combination with a frame, a revoluble pressure-chamber and a liquid-containing tank, of a carrying-arm pivoted intermediate of its ends on the walls of said pressure-chamber, a yoke at its outer end, adjustable clamps in said yoke one of which is adapted to move longitudinally of the carrying-arm and close the open end of a can held between said clamps, pneumatic connections leading from said pressure-chamber through one of said clamps to a can held thereby and means operated by a movement of said carrying-arm acting to force air under pressure into the can and to permit the escape of the same therefrom.

42. In a machine of the class described a pressure-chamber, a vertically-movable carrying-arm pivoted thereon, clamping members on the outer ends of the arm adapted to engage a can or the like, one of said clamping members being longitudinally movable automatically in said arm and adapted to close the open end of a can held between said clamping members, a pipe opening into the pressure-chamber and communicating with the open end of a can through said movable clamping member, and means operated by the movements of the arm with respect to the said pressure-chamber acting to admit air under pressure to said can and for permitting the escape of the same therefrom.

43. In a machine of the class described a revoluble pressure-chamber, vertically-movable carrying-arms pivoted thereon, a fluid-receptacle for each of said arms rigidly secured on said chamber and rotative therewith, clamping members on the outer ends of said carrying-arms adapted to engage a can or the like, one of said clamping members being longitudinally movable in its carrying-arm and adapted to close the open end of a can held by said clamping members, a pipe opening into the pressure-chamber and communicating with the open end of a can through said movable clamping member, a valve acting to control the flow of air through said pipe and means operated by the movement of the carrying-arm with respect to said pressure-chamber acting to operate said valve.

44. In a machine of the class described a pressure-chamber, vertically-movable carrying-arms pivoted thereon, clamping members at the outer end of each carrying-arm adapted to engage a can or the like one of which is adapted to close the open end of the can, a pipe connecting said pressure-chamber with said open end of the can through said clamping member and a valve connected with said pipe and acting when the carrying-arm is in one position to admit air from said pressure-chamber into cans clamped on said carrying-arms and when said carrying-arms are in another position permitting the escape of air from said cans.

45. In a machine of the class described, a pressure-chamber, vertically-movable carrying-arms pivoted thereon, clamping members at the outer end of each carrying-arm adapted to engage a can or the like, one of which is adapted to close the open end of the can, a pipe connecting with said pressure-chamber and with the open end of the can through one of said clamping members and a valve connected with said pipe and acting to admit air from the pressure-chamber into said can when the carrying-arm is in its depressed position and acting to close the communication with the pressure-chamber and permit the escape of air from the can when the carrying-arm is in its elevated position.

46. In a machine of the class described a pressure-chamber, vertically-movable carrying-arms pivoted thereon, adjustable clamping members at the outer end of each carrying-arm adapted to engage a can or the like, one of said clamping members being longitudinally movable and adapted to close the open end of said can, a pipe connecting with said pressure-chamber and the open end of a can through said longitudinally-movable clamping member, a valve connected in said pipe and operative connection between said carrying-arm and said valve whereby downward movement of said carrying-arm acts to admit air under pressure into said can while upward movement of said carrying-arm acts to close the connection with said pressure-chamber and permits the escape of air from said can.

47. In a machine of the class described, comprising a pressure-chamber having vertically-movable carrying-arms pivoted thereon, provided with clamping means adapted to engage a can or the like at the outer end of said carrying-arm, of a two-way valve connected with said pressure-chamber and with the open end of a can through one of said clamping members, a rod secured on said carrying-arm and having operative connection with said valve and adapted to open the communication between said pressure-chamber and said can when the carrying-arm is in a depressed position and to close the connection with the pressure-chamber and permit escape of air from the can when the carrying-arm is elevated.

48. The combination with a pressure-chamber having vertically-movable carrying-arms pivoted thereon, provided with adjustable clamping members at the outer end of the same, of a valve connected with said pressure-chamber, a tube connecting said valve through one of said clamping members with the open end of a can adapted to be clamped at the end of said carrying-arms, a rod secured on said carrying-arms and connected at its upper end with a rod adapted to operate said valve and acting when the carrying-arm is depressed to permit air from said pressure-chamber to flow into said can and acting when the arm is in its elevated position to close the communication with the pressure-chamber and to permit air to escape from said can.

49. In a machine of the class described the combination with the pressure-chamber and vertically-movable carrying-arms provided at their outer ends with clamping members adapted to engage a can or the like, of a valve communicating with said pressure-chamber and with the open end of a can through one of said clamping members, said valve being provided with a passage leading into said pressure-chamber, and a vent-passage, closures for said passages and means operated by movement of a carrying-arm whereby communication with the pressure-chamber may be closed while the vent-passage remains open and vice versa.

50. In a machine of the class described the combination with the pressure-chamber and vertically-movable carrying-arms having at their outer ends clamping members adapted to engage a can or the like, of a valve communicating with said pressure-chamber and the open end of a can through one of said clamping members, said valve being provided with a passage leading into said pressure-chamber and a vent-passage, closures for said passage, a valve-stem having operative connection with a carrying-arm and provided on its inner end with an arm adapted to open the vent-passage when the passage to the pressure-chamber is closed and to open the passage to said pressure-chamber when the vent-passage is closed.

51. In a machine of the class described, in combination with the pressure-chamber and vertically-movable carrying-arms provided at their outer ends with clamping members adapted to engage a can or the like, of a valve communicating with said pressure-chamber and with the open end of a can held between said clamping members said valve being provided with a passage leading into said pressure-chamber and a vent-passage, closures for said passages, a valve-stem provided at its inner end with arms adapted to open either of said passages while the other remains closed, a crank-arm secured at the outer end of said valve-stem, a rod connecting the same with a carrying-arm whereby movement of the said carrying-arm in one direction acts to open the passage leading to the pressure-chamber and to close said vent-passage while movement of the carrying-arm in the opposite direction acts to open said vent-passage and to permit closing of the passage leading to the pressure-chamber.

52. In a machine of the class described a vertically-movable carrying-arm provided at its outer end with a yoke having at its outer end and opposite sides adjustable clamping means adapted to receive a can of a desired size, of a longitudinally-movable clamping member adjustably secured at the inner end of said yoke provided with a resilient head adapted to close the open end of a can or the like, a tube communicating with a pressure-chamber and a can clamped between said clamping members, and means for moving said clamping member longitudinally comprising a lever pivoted on the under side of the same and acting to retract said clamping member when in one position and to extend the same when in another position 53. In a machine of the class described, a carrying-arm provided at its outer end with a yoke provided at its outer end and on each side with inwardly-facing adjustable clamping members, a longitudinally-movable clamping member at the inner end of said yoke said member comprising a stem and a pneumatic head adapted to close the open end of a can or the like and provided with connections for admitting air therethrough within said can, the stem of said clamping member extending longitudinally of said carrying-arm and provided on its under side with a toggle one end of which is secured on said stem and the other end to said carrying-arm and means for actuating said toggle and acting to retract or extend said clamping member in said yoke.

54. The combination with a frame, a cap revolubly supported thereon, carrying-arms pivoted thereon each provided at its outer end with a yoke having on each side and at the outer end of the same adjustable clamping members adapted to be rigidly secured therein, a longitudinally-movable clamping member at the inner end of said yoke adapted to close the end of a can or the like secured between said clamping members and comprising a stem and a pneumatic head provided with means for admitting therethrough air under pressure, a toggle one end of which is secured to said longitudinally-movable clamping member the other end to said carrying-arm and means for operating said toggle comprising a stud secured on said frame and adapted to engage said toggle at the joint at a point in the revolution of the cap, and means for operating said toggle in the opposite direction comprising a stud also secured on said frame and adapted to engage the outer end of one bar of said toggle.

55. The combination with a fluid-containing tank of a frame located beside the same, a cap revolubly supported on said frame and having a pressure-chamber therein, vertically-movable carrying-arms pivoted intermediate of their ends upon said cap each provided at its outer end with a yoke having on each side and the outer extremity of the same inwardly-directed clamping members, a longitudinally-movable clamping member at the inner end of said yoke adapted to close the open end of a can secured between said clamping members, pneumatic connections through said clamping members and said pressure-tank and means adapted to actuate said longitudinally-movable clamping member whereby a can may be engaged in said yoke or released therefrom.

56. The combination with an annular, revoluble fluid-containing tank, of means for partly supporting the same in a fluid, means for heating the fluid in said tank, and radial partitions dividing the tank into compartments.

57. In a device of the class described, the combination with an outer fluid-containing tank, of a heating-coil in the bottom thereof, an inner annular tank having an apertured bottom, radial partitions dividing said annular tank into a plurality of compartments and means for revolving said annular tank.

58. The combination with an outer fluid-containing tank, of a heating-coil therein, an annular revoluble tank in said outer tank, and adapted to be partly fluid-supported, partitions in said revoluble tank dividing the same into compartments, each adapted to receive a can to be tested, said revoluble tank having apertures opening into each compartment and adapted to permit fluid from the outer tank to pass therethrough, and means connected with said revoluble tank and rotative therewith adapted to submerge said cans therein.

In witness whereof I have hereunto subscribed my name in the presence of two subscribing witnesses.

EDWARD P. HOLDEN.

In presence of—
    CHARLES W. HILLS,
    L. J. DELSON.